Patented Jan. 25, 1938

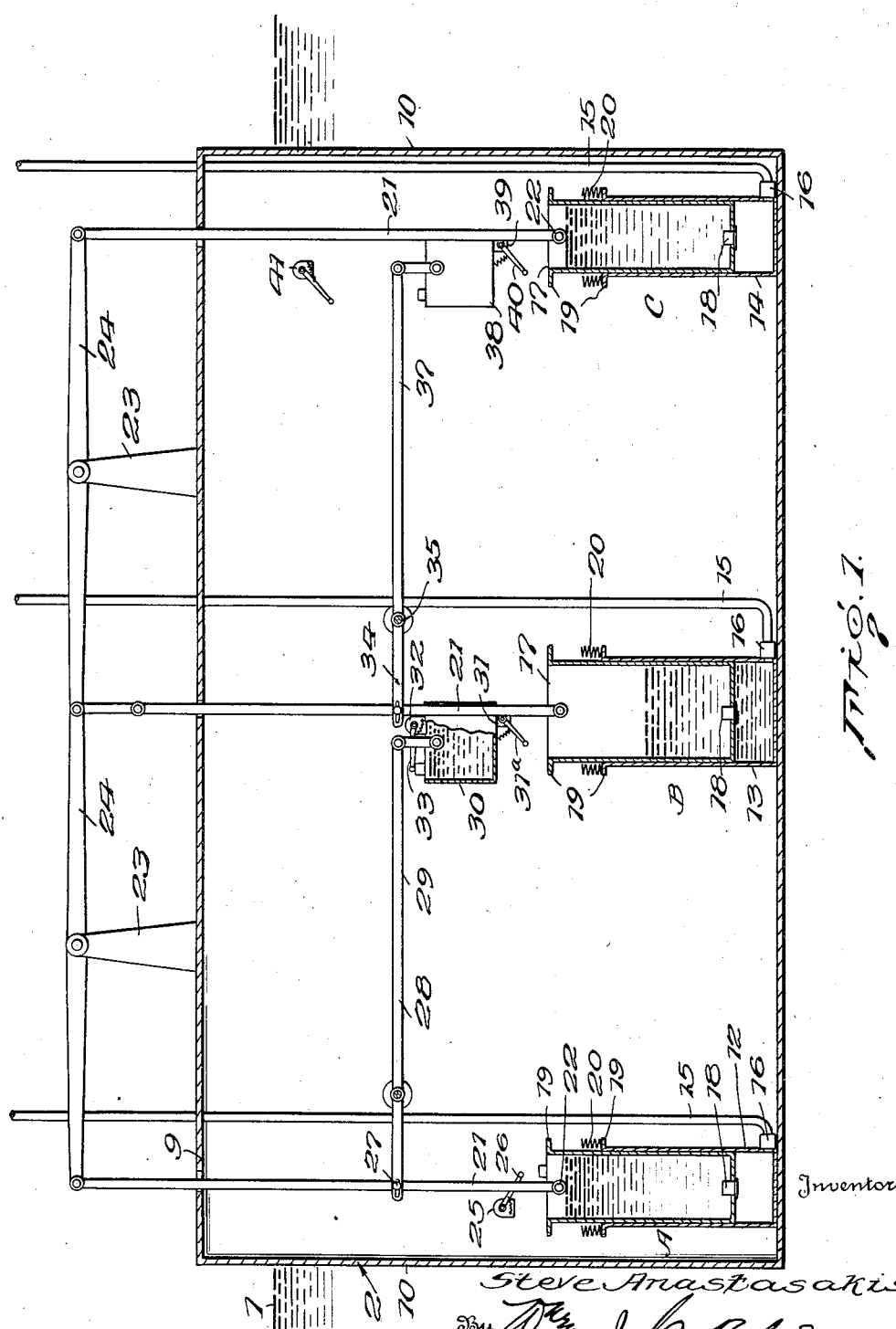

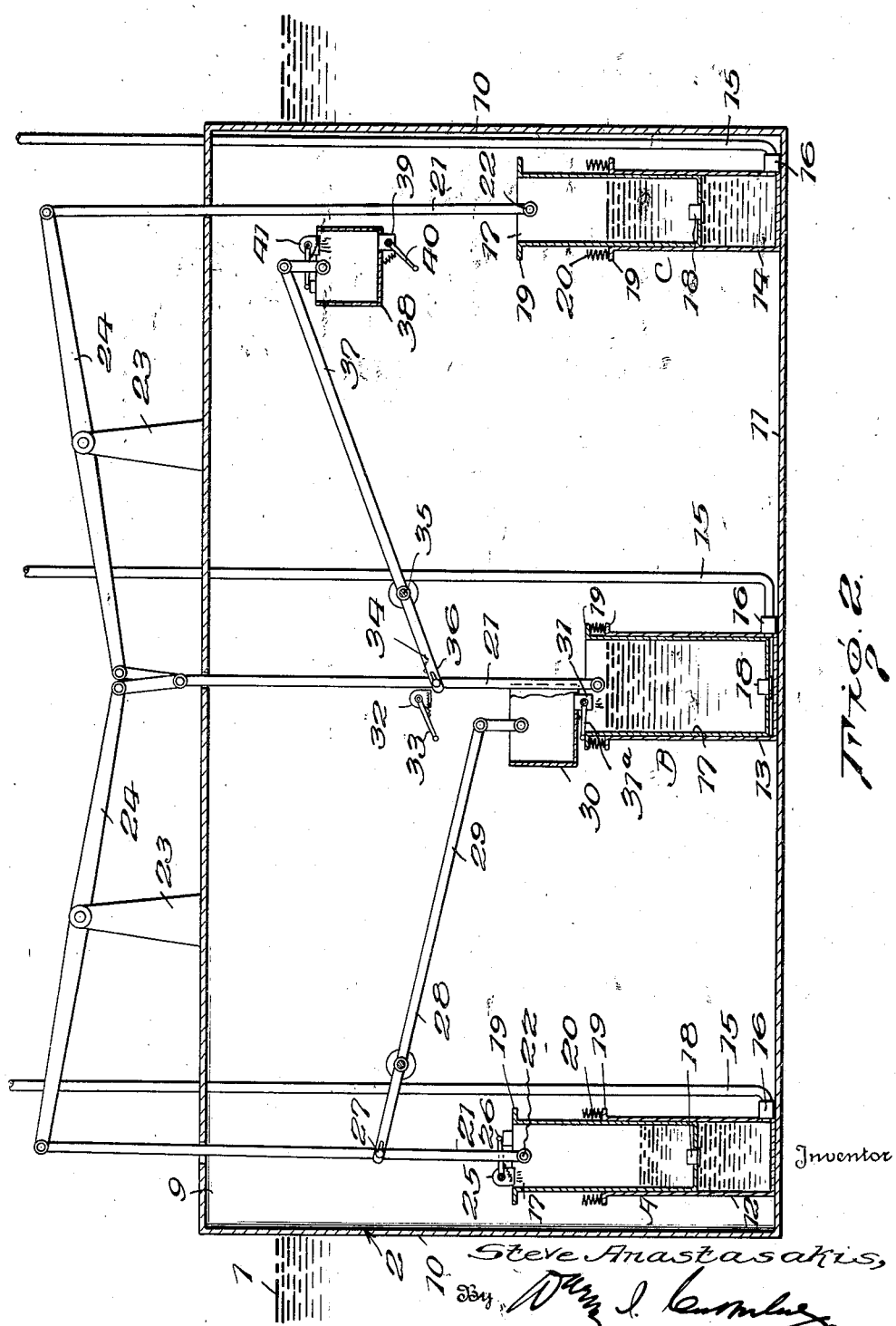

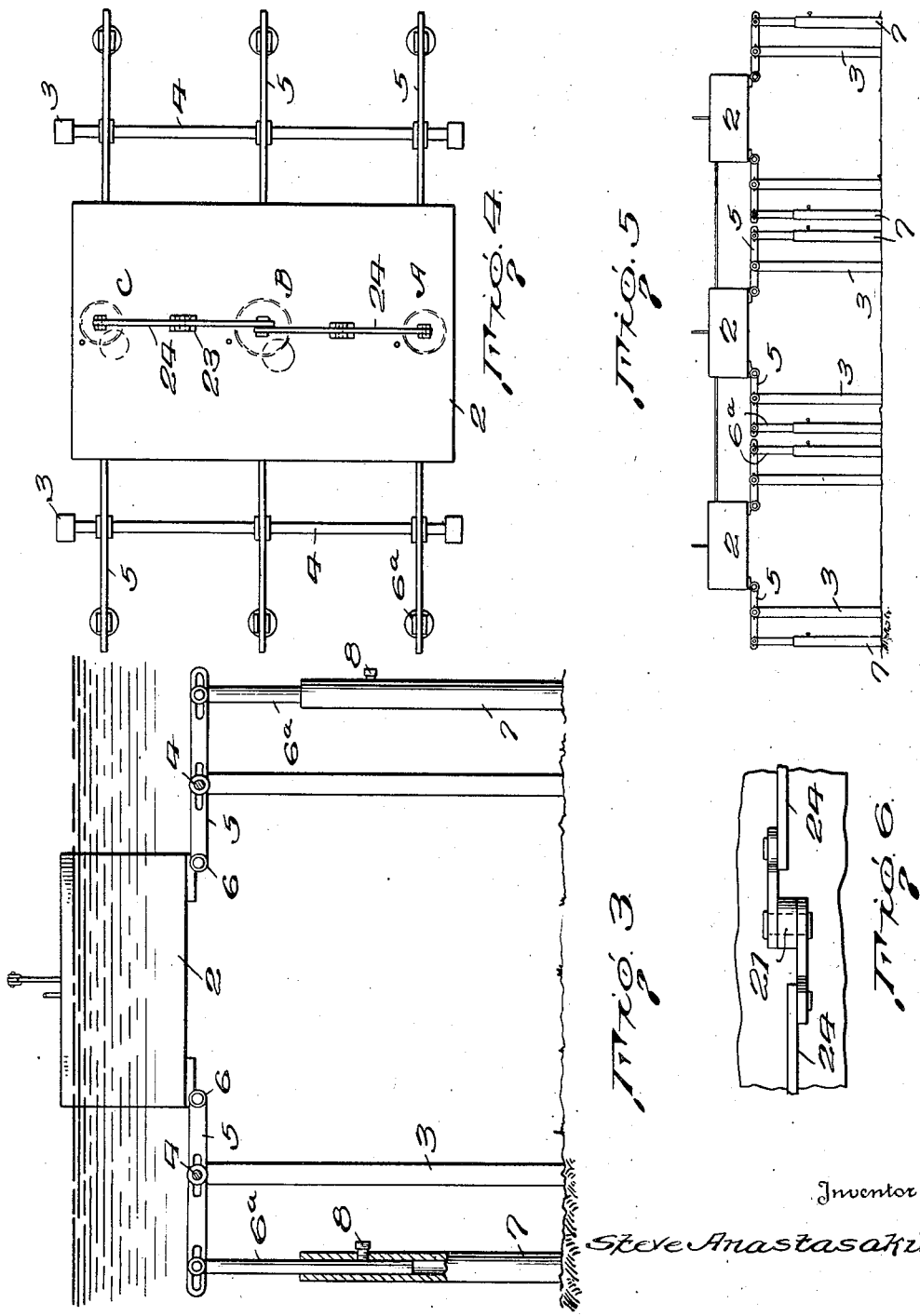

2,106,264

UNITED STATES PATENT OFFICE 2,106,264

WATER MOTOR

Steve Anastasakis, Clarksburg, W. Va.

Application July 16, 1936, Serial No. 90,986

4 Claims. (Cl. 103—55)

My present invention, in its broad aspect, has to do with the raising or elevation of water above its ordinary level by means of weight or gravity, the pressure of the water supply or its weight, and the utilization of leverage, and is not to be confused with so called "perpetual motion machines" to which it has no relationship. More particularly my invention contemplates the use of a relatively large container or floating caisson which is placed in a body of water such for instance as a lake, river, ocean or the like and maintained therein at a normal level with reference to the level of the water irrespective of the rise or fall of the lake, river, ocean or the like. The container or caisson is normally dry, but has water intake valves at various positions below the level of the body of water in which it is placed which are automatically opened from time to time to admit water to my motor to replenish its supply and assist in its operation. Within the container or caisson are a plurality of cylinder and piston units; two of which are of less weight and capacity than the third, and the piston elements of which are connected with leverage apparatus normally based on a four-to-one ratio, and which in turn are connected with suspended tanks from which the water supply to two of the cylinders is obtained; said tanks being associated with the water intake valves of the caisson, and the other cylinder and piston unit being connected to an intake valve of the caisson. As broadly described above my apparatus is designed to make use of several natural principles to effect its operation (1) the weight or bulk and pressure of incoming water through the intake valves in the caisson (2) the weight of the piston units or gravity to exert pressure and force to supplement that of incoming water, and (3) the use of leverage—the Archimedes' principle—to distribute the various forces so that the motor will operate to raise the water taken into my machine to the desired level through pipes.

My invention requires for its operation a continuous source of water supply to power it, and it is only necessary to start the motor and it will operate so long as the water supply exists, saving repairs, wear and tear, and replacement of worn parts.

The uses of my invention are many; it may be used as a city water system to pump water from a source of supply into the mains; it may be used as a power unit for generation of electricity and the like; it may be used as an accessory in a manufacturing plant where it is desired to operate upon liquids other than water, since my invention will operate in any liquid; it may be used in rural communities to furnish water to farms and the like; it may be used where it is required that water from a lake or river or the like be transported to distances, or raised to higher levels. In fact its uses are almost as many as the activities of man dictate.

My invention requires no supplementary power in its operation, and will continue to operate so long as the source of water supply is available, as heretofore stated; it is therefore economical to operate and should afford a much cheaper and more efficient plant than has heretofore been in use; there are few parts which can get out of order and none so fragile as to need constant attention or repair.

Other and equally important objects and advantages of my invention will be apparent as the description of my invention proceeds with reference to the drawings forming a part of this application, but interpretation of the invention should only be conclusive when made in the light of the subjoined claims.

In the drawings wherein I have illustrated a preferred form of my invention;—

Figure 1 is a side elevation, partly in section and shows the various parts of my invention at what I term the initial stage in its operation;

Figure 2 is a side elevation, partly in section and similar to Figure 1, and shows the various parts of my invention in the second or power stage;

Figure 3 is a side elevation of the assembly showing the manner in which it is carried in the lake, river, ocean or the like;

Figure 4 is a top plan view of my invention and its supporting structure;

Figure 5 is a view of a number of motor units employed so that if one or more get out of order others may be used; this system is desirable in supplying water to city mains, and Figure 6 is a detailed view of the shaft and lever coupling between the various cylinder and piston assemblies of my motor.

In the drawings wherein like characters of reference are used to designate like or similar parts throughout the several views thereof;—

The numeral 1 designates a body of water such as a lake, river, reservoir, ocean or the like, or any other body of liquid, such for instance as a chemical or the like. Supported in the body of liquid is a container or caisson 2; there being posts 3 footing at the bottom of the liquid as shown in Figures 3 and 4 and carrying a shaft 4 on each side and parallel and spaced from the side walls of the caisson and on which are arranged levers 5, the inner ends of which are hinged to the bottom of the caisson or container 2 at either side as shown at 6 and the outer ends of which are pivotally attached to vertical shafts 6ᵃ preferably carried in tubes 7 resting on the bottom and designed to support the caisson and at the same time permit the container or caisson to retain a fixed level with respect to the water level irrespective of the rise or fall of the water level.

The cradle or supporting structure above described for the container or caisson 2 is designed to have a certain amount of manual adjustability so that the caisson will remain, if desired, at a certain level, for instance lock pins 8 may be used for that purpose. In practice the upper edge of the caisson or container is sufficiently above water level so that it will remain dry. In the form herein shown the container or caisson 2 has side walls 9, ends 10, a bottom 11, and a top (not shown) since same has been removed to clarify the showing of the parts.

My invention, as below described, may be duplicated any given number of times within a single caisson or container depending upon the capacity of the container and the amount of power to be generated. Within the caisson and resting on the bottom and attached in any suitable manner thereto are three cylinders 12, 13 and 14; these are arranged in a row and spaced from each other lengthwise of the container, and the two end cylinders are smaller than the middle or intermediate cylinder; the intermediate cylinder is preferably formed of iron, copper, or some relatively heavy metal, and the end cylinders are formed of aluminum or some lighter metal, and the walls of all of the cylinders are sufficiently thick to withstand any predetermined pressures. Each cylinder has vertical pipes 15 leading up above the container or caisson to any desired distance and it is these pipes that carry the water used for power or for any other desired purpose, such for instance as the transportation of water to a common main for city drinking purposes. Each pipe is provided with a check valve 16 so that water pumped into the pipes will not return to the cylinders. Within each cylinder is a hollow, open topped piston 17. The open topped piston and its companion cylinder constitute the basic operating units for my invention, and if several, as for instance two, three or four sets of units are used in a single caisson; there will be similar rows of cylinders, pistons and all other operating parts; therefore if two units are used there would be six cylinders and six pistons; if three units are used there would be nine cylinders and nine pistons; these units of cylinders and pistons are arranged in parallel rows lengthwise of the caisson or container. The vertical pipes 15 are shown in the drawings as terminating above the container or caisson; these however may be extended any desired distance and may lead to water operated power units for generation of electricity or the like, or may lead to a common water main for city water distribution, it being assumed that if the water acted upon by my motor can be ejected in a powerful stream or raised to any desired limit that the resultant power can be put to any useful purpose for which power is ordinarily used. Furthermore the pistons may be provided with suitable packing rings of metal or leather where they engage the cylinder walls so that leakage and loss of power will not take place. The pistons are formed of the same metal as their associated cylinders and each has a check valve in its bottom so that water passing from the pistons to the cylinders will not return to the interiors of the pistons. These check valves are designated 18 and they are of the type which automatically open when subjected to a predetermined pressure, as for instance to 1000 lbs. of water. The upper peripheries of the cylinders and pistons are flanged as shown at 19 and springs are arranged between the flanges to prevent the pistons from imposing sudden impact upon the bottoms of the cylinders; the springs being designated 20. A vertical shaft 21 is pivotally connected as at 22 to each piston and rises to a point above the upper edge of the container or caisson 2.

Pivotally mounted upon vertical supports 23 fixed to the container or caisson 2 are levers 24; these levers 24 are pivoted at their centers as shown in Figures 1 and 2 and their ends are respectively pivotally connected to the respective vertical shafts 21, except that the shaft leading from the center or intermediate piston in cylinder 13 is connected to both levers 24, as shown in Figures 1, 2 and 6.

The foregoing completes the description of the piston and cylinder units, which will hereinafter be designated A—B and C for the sake of clarity.

Arranged above the piston of unit A is a water intake valve 25 which has an operating arm 26 disposed to engage the periphery of the piston near the limit of its upward stroke so that the piston is refilled with water as it approaches the limit of its upward stroke. The vertical shaft 21 of unit A is connected as at 27 to the small arm of a pivoted lever 28, the longer arm 29 of which carries a tank 30. The ratio of this lever is four-to-one and the tank 30 has a check valve 31 and is arranged to discharge water directly into the piston of unit B as shown in Figures 1 and 2. The valve 31 has an arm 31a so that when the weight of water in the tank 30 causes it to move down and the piston of unit B moves up to engage the arm or the like the piston of unit B will be refilled. Above tank 30 is an intake valve 32 operating to refill the tank from the source of water supply. This valve has a lever 33 engaged by the tank at a point approaching its upper position to be opened to replenish the water supply in the tank. It will be noted that the weight of water in the tank 30 exerts a force four times greater by reason of the ratio of four-to-one of the lever 28 upon the vertical shaft of unit A.

A lever 34 is pivoted at 35 so that the short arm 36 engages the vertical shaft of unit B and the long arm 37 carries a tank 38 similar (but smaller) than tank 30. The ratio of arms 37 and 36 is four-to-one as is the case with lever 28. Tank 38 has a valve 39 provided with an arm 40 which engages the piston of unit C to refill the piston from the tank when the arm is engaged, and a valve 41 disposed above the tank 38 operates to refill the tank from the source of water supply when it is empty. It will be noted that there are three valves admitting water from the source of water supply such as a lake, river or the like; these are valves 25, 32 and 41. In mounting tanks 30 and 38 on the long lever arms care should be taken that they are swung on-center so that they will not tilt.

The operation of my invention is best illustrated by reference to Figures 1 and 2. In order to clearly illustrate how my invention operates the question of specific weights of matter must be taken into consideration, but it must not be understood that the specific weights hereinafter referred to are in limitation of the application of the invention since relative weights are subject to change with the size of the machine to be built and its purposes, and the type of liquid used. However, for purposes of illustration only, and with the understanding that the given weights are approximates only, the following explanation of the operation of my invention is given:—

Assuming that the weight of the piston 17 of unit B is about 2200 pounds; and that the weights of the pistons in units A and C are respectively 640 pounds, and that the water capacities measured in pounds of pistons in units A—B—C are respectively 1600 pounds for unit A, 2000 pounds for unit B, and 1600 pounds for unit C, and that tank 30 holds 1000 pounds of water and tank 38 holds 800 pounds of water; the operation is as follows; as shown in Figure 1, tank 30 is full; piston 19 of unit A is full; piston 17 of unit B is half-full, with the cylinder 13 below piston 17 in unit B full and piston 19 of unit C full and tank 38 empty. Piston 17 of unit B will be moved down to force the water or other liquid from cylinder 13 into pipe 15 under the pressure exerted by the weight of the piston 2200 pounds; weight of the water (½ full), 1000 pounds; plus the four-to-one leverage (measured in pounds) exerted by tank 30, through lever 28 and shafts 21 and lever 24, which is 4000 pounds; a total force of 7200 pounds; opposing forces are represented by weights of pistons in units A and C totalling twice 640 pounds or a total of 1280 pounds, and the weight of water therein totalling 3200 pounds; the total being 4480 pounds; leaving a resultant pressure upon the water in the cylinder of unit B of 2720 pounds which is effective to force the water up through pipe 15 with considerable pressure behind it.

As the piston 17 of unit B moves down under the resultant 2720 pounds; tank 30 moves down and pistons 19 of units A and C move up, as well as tank 38. When the limit of movement is approached valves 18 of pistons in units A and C operate to evacuate the pistons into tanks 12 and 14 and valve 25 is actuated to refill piston 17 of unit A (see Figure 2); tank 30 in the meantime has moved down to the position shown in Figure 2 and valve 31 opens to refill the piston in unit B so that when the downward movement of said piston is reached the piston is half full; tank 38 in the meantime has moved up and been filled through valve 41, and both the piston and cylinder of unit C are full as shown in Figure 2; the second cycle of movement then takes place as follows.

The forces operating to force the pistons of units A and C down are as follows; weights of pistons 17 of units A and C—twice 640 pounds or a total of 1280 pounds. Water in piston 17 of unit C is 800 pounds; water in tank 38 multiplied by a four-to-one leverage of lever 34 is 3200 pounds, to which is added 1600 pounds of water in piston 17 of unit A, giving a resultant total of 6880 pounds, as against an opposing force comprising the weight of the piston of unit B, which is 2200 pounds; plus 2000 pounds of water therein, or a total of 4200 pounds, giving an excess force to expel the water from the cylinders of units A and C of 2680 pounds which is more than sufficient to expel the water through pipes 12 of units A and C. When this cycle is completed the various parts of the motor have assumed the position and condition shown in Figure 1 and the cycles of operation are again repeated. It will be noted that the valves admitting water to the pistons and tanks are arranged to complete the filling operation through the latter part of the operation of the same so that refilling and emptying is a smooth operation and not ordinarily accompanied with sudden applications of force. From the foregoing it will be seen that admission of water from the source of supply to various operating parts plus the use of the weight of such parts, or the gravitational pull, plus the utilization of the Archimedes' principle of the lever in terms of four-to-one ratio effects actuation of the motor with the result that a strong and continuous pumping operation is attained which may be used either for power purposes or for water distribution. The operation is continuous so long as the water supply exists, and the only attention necessary is that of maintenance of the parts in working condition.

While in the foregoing I have illustrated and described a specific application of my invention and some of its advantages, I do not wish to be understood as limiting myself thereby, since the broad concept of my invention may be expressed through different or modified arrangements of parts and size, weight, shape and disposal of such parts are to be dictated by the requirement of special practice; the scope of my invention is therefore to be determined from the claims appended hereunto and forming a part of this application.

I claim:—

1. A fluid motor comprising a plurality of piston and cylinder assemblies, certain of which are of different weights and capacities; four-to-one leverage connections to said assemblies and connected with the pistons; tanks associated with said leverage connections, a fluid tight receptacle in which said parts are located and having fluid intake ports communicating with a source of fluid supply, and valve means carried by said receptacle for controlling inflow of fluid from said ports and discharging to said tanks and to one of said cylinder and piston assemblies, and means whereby said valves are periodically and separately opened and closed to admit measured quantities of fluid to said tanks and said piston and cylinder assembly to actuate the various parts of the motor.

2. A fluid motor comprising a plurality of cylinders and a plurality of hollow, open topped pistons in said cylinders, certain of said piston and cylinder assemblies being of different weights and capacities; leverage connections to said piston and cylinder assemblies and connected with the pistons; tanks carried by said leverage connections and having valves opening into the pistons of certain of said assemblies; a fluid tight receptacle in which said parts are located and having fluid intake ports communicating with a source of fluid supply, and valve means in said receptacle for controlling inflow of fluid from said ports and discharging to said tanks and to one of said piston and cylinder assemblies whereby the periodic and separate opening and closing of said intake valves admitting measured quantities of fluid to said tanks and to said piston and cylinder assembly will cause said motor to be actuated.

3. A fluid motor comprising a fluid tight caisson or container, means for maintaining said caisson or container in a body of fluid at a certain predetermined level with respect to the fluid level irrespective of the rise or fall of the fluid level, said container having fluid intake valves; a plurality of piston and cylinder assemblies in the container, a plurality of tanks in the container, leverage connections between the tanks and the piston and cylinder assemblies; outlet pipes from the cylinders, and said valves operative to periodically admit measured quantities of fluid at separate intervals to said tanks and to one of said piston and cylinder assemblies whereby to actuate said piston and cylinder assemblies to pump fluid through the outlet pipes.

4. A fluid motor comprising a container having fluid intake ports communicating with a source of fluid supply, valves in the container for admitting fluid through said ports to the interior thereof from the source of fluid supply without said container; cylinders in said container; hollow, open topped pistons in said cylinders; tanks receiving fluid from said valves, one of said valves delivering fluid to one of the open topped pistons, and a four-to-one leverage arrangement connecting the tanks to the pistons in said piston and cylinder assemblies whereby the operation of said valves periodically and at separate times will actuate said motor.

STEVE ANASTASAKIS.